(No Model.) 4 Sheets—Sheet 1.
G. A. BOYDEN.
METHOD OF OPERATING CAR BRAKES.
No. 373,005. Patented Nov. 8, 1887.
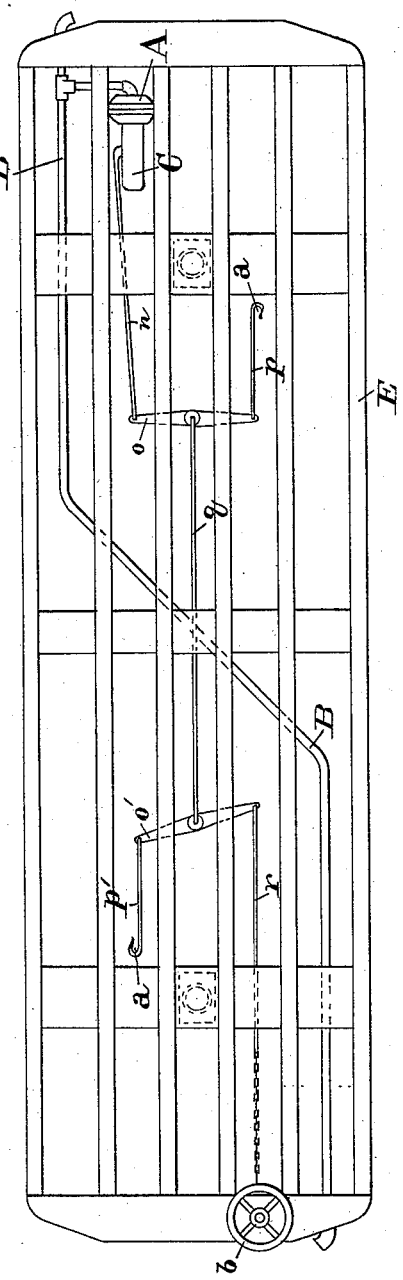
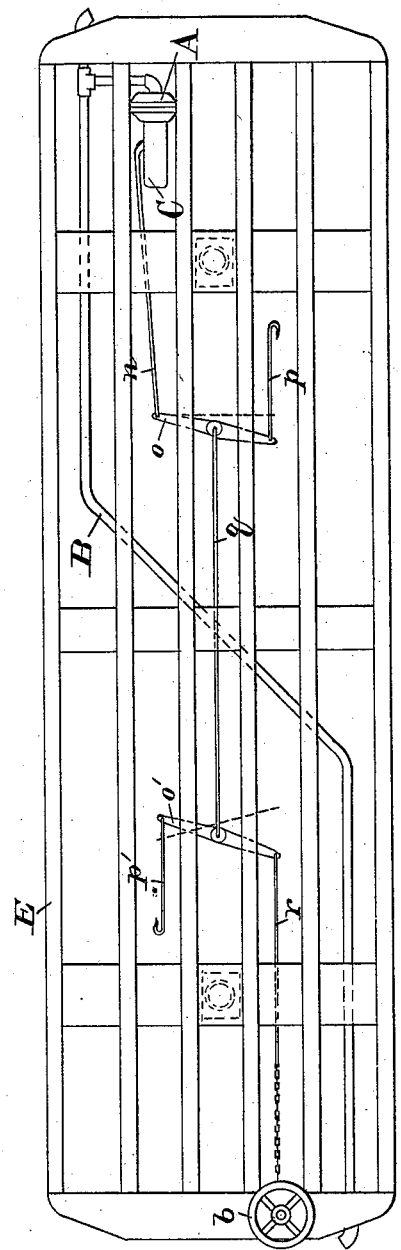

(No Model.) 4 Sheets—Sheet 2.
G. A. BOYDEN.
METHOD OF OPERATING CAR BRAKES.
No. 373,005. Patented Nov. 8, 1887.
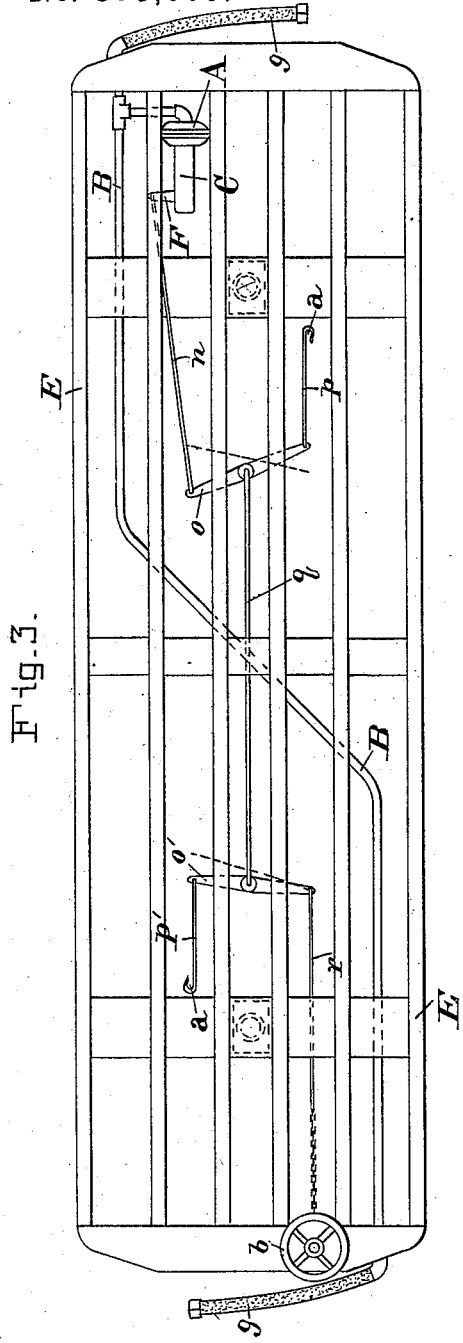
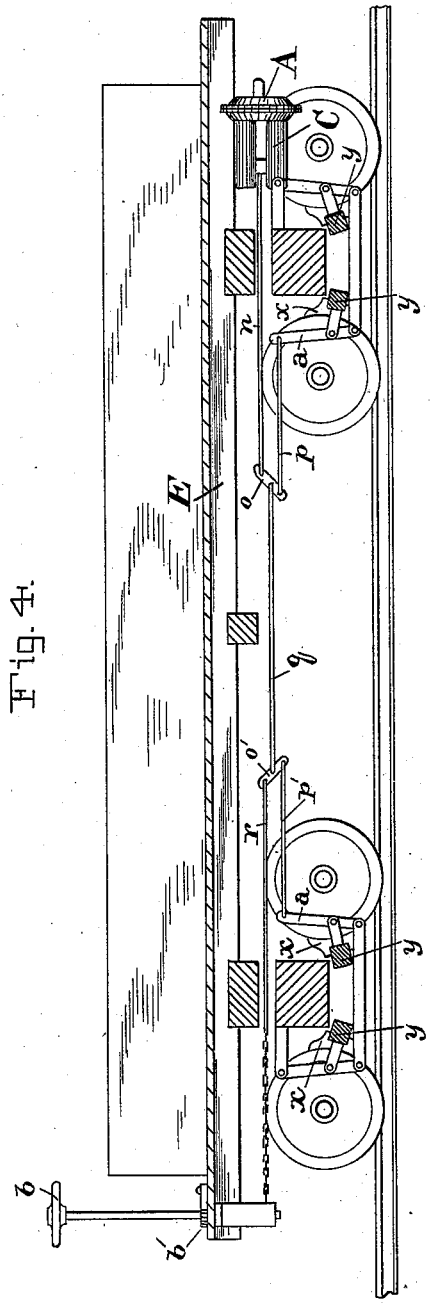
WITNESSES:
R. L. Clemmitt.
John E. Morris.
INVENTOR:
Geo. A. Boyden
BY Chas. B. Mann
ATTORNEY.

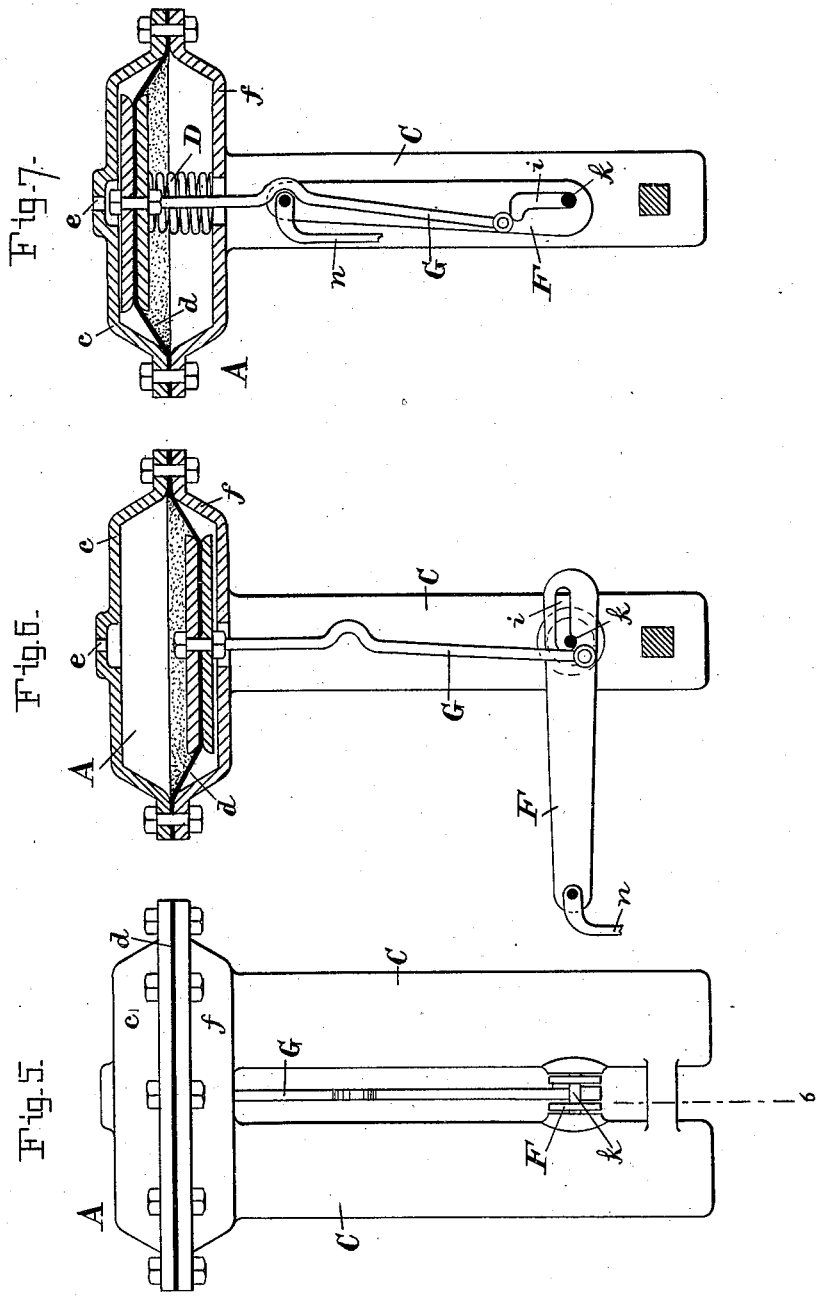

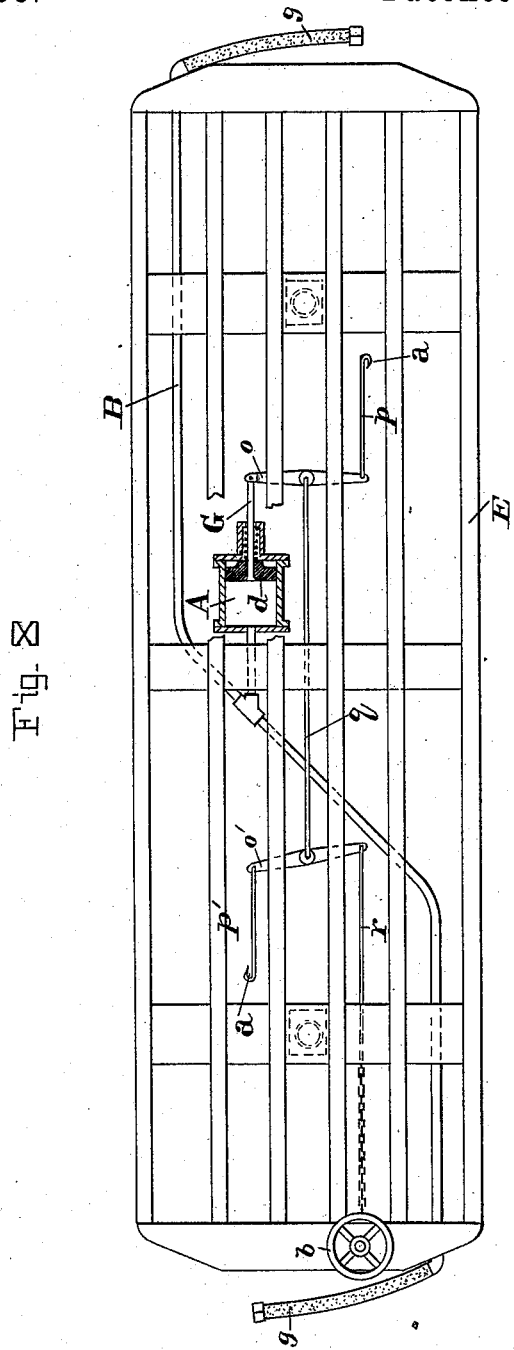

UNITED STATES PATENT OFFICE.

GEORGE A. BOYDEN, OF BALTIMORE, MARYLAND, ASSIGNOR TO THE BOYDEN POWER BRAKE COMPANY OF BALTIMORE CITY, OF MARYLAND.

METHOD OF OPERATING CAR-BRAKES.

SPECIFICATION forming part of Letters Patent No. 373,005, dated November 8, 1887.

Application filed September 5, 1887. Serial No. 248,806. (No model.)

*To all whom it may concern:*

Be it known that I, GEORGE A. BOYDEN, a citizen of the United States, residing at Baltimore, in the State of Maryland, have invented certain new and useful Methods of Operating Fluid-Pressure Car-Brakes, of which the following is a specification.

My invention relates to power-brakes operated by compressed fluid supplied through a continuous train-pipe leading from the locomotive. Car-brakes of this class are provided with a hand-wheel shaft, by which the brakes may be operated independently of the power mechanism. When the power mechanism is operating the brakes, the said hand-wheel shaft takes no part, and when the hand-wheel shaft is employed the power mechanism plays no part.

The object of my invention is to utilize and employ the ordinary hand-wheel shaft which each car is provided with to apply the brakes with the desired pressure, and then to operate the brakes by the power mechanism controlled by the engineer.

The invention is a new method of operating brakes. The hand-brakes of the respective cars throughout a train are applied with a pressure corresponding to the load each car may be carrying, and then using fluid-pressure to operate the power mechanism of the brakes at the pressure predetermined by the hand-brake. In this way the most effective braking may be done, as the brakes of each car in a train will be governed by the uniform power (the fluid-pressure) existing in the continuous train-pipe, so as to have a force or a pressure corresponding to the load each car may be carrying. This result of my method of operating fluid-pressure brakes may be obtained by employing mechanism of various constructions, and two forms of power mechanism, by either of which the invention may be carried into effect, are illustrated in the accompanying drawings, in which—

Figure 1 is a plan view of a car-frame with the brake mechanism attached and the floating levers in the position they occupy when the brakes are released by the hand-shaft. Fig. 2 shows the position of the levers when the brakes are applied by the hand-shaft. Fig. 3 is a like view showing the floating levers in the position they occupy when the brakes are released by the fluid-pressure. Fig. 4 is a sectional elevation of a car, showing the hand-wheel shaft, the power-brake mechanism, and the "foundation-gear" connecting with both the said hand-wheel shaft and power-brake mechanism. Fig. 5 is a side view of one form of power mechanism in which springs are employed to apply the brakes and compressed air to release and control them. Fig. 6 is a section of the spring-power device, being a transverse view from that seen in Fig. 5, and showing the position of the parts when the brakes are released or held off by the compressed fluid. Fig. 7 is a like sectional view of the same, showing the position of the parts when the brakes are on—that is, when the compressed air has been exhausted. Fig. 8 shows a car-frame with air-brake mechanism. The piston has the position which it occupies when the brakes are on, and the floating levers, as in Fig. 1, have the position they occupy previous to the application of the brakes by the hand-shaft.

In the construction of power mechanism shown in Figs. 1 to 7 the car-brakes are applied by the pressure of a spring, and released, held off, and controlled by the pressure of compressed air. In the construction of power mechanism shown in Fig. 8 the car-brakes are applied and controlled by compressed air on the plan of ordinary air-brakes.

Any description of brakes, including both "air" and "vacuum," which employ a continuous train-pipe leading from the locomotive may be operated by my method. The car may be equipped with any ordinary or well-known foundation-gear brake mechanism, which includes shoes $x$, brake-beams $y$, and levers $a$ on the trucks, and the rods or chains and levers which connect these parts with the power mechanism and ordinary hand-wheel shaft, $b$.

The letter A designates an expansible chamber for compressed fluid. This chamber in the present instance is a metal box or drum, having a rigid side, $c$, (see Fig. 6,) and a movable side, $d$. The form of movable side here shown is that commonly called a "flexible" diagram, which is secured to the metal box part in any suitable manner. Other known forms of expansible chamber, such as a cylinder and piston, as shown in Fig. 8, may be used. An opening, $e$, in the rigid side of the chamber provides for a connection with the train-pipe B, and a frame or open cover $f$, is secured to the said chamber A over the flexible diaphragm. One or more tubular-shaped pockets, C, are rigidly secured to the said frame $f$, and a spiral spring, D, occupies each pocket and is in contact with the diaphragm-plate and presses the diaphragm toward the rigid side $c$ of the chamber. When fluid under pressure enters the expansible chamber A, the flexible diaphragm is forced back against the springs D, as shown in Fig. 6, and the latter will be contracted and the brakes held off. When fluid-pressure is exhausted from the chamber, the springs will expand, causing the diaphragm to take position against the rigid side $c$ of the chamber, as shown in Fig. 7, and the brakes will be applied. The expansible chamber A is secured on the car-frame E. A slack lever, F, has a slot, $i$, and is pivoted through the said slot by a fixed pin, $k$. Said lever may therefore turn on the pivot, and when it has turned from the position shown in Fig. 6 to the position shown in Fig. 7 it will disengage from the pivot $k$ and slide or reciprocate in the direction of its length. The rod G connects the movable side $d$ of the expansible chamber with the slack lever F. When the said movable side and rod draws on the slack lever, the latter will first turn through an arc of about ninety degrees from the crosswise position which it has in Fig. 6 to the endwise position seen in Fig. 7, where it is parallel with the diaphragm-rod, and while in this parallel position the lever and rod may reciprocate in unison. A rod, $n$, connects the slack lever to one end of one of the floating levers $o$ of the foundation-gear.

The rods or chains and levers before refore referred to as included in the foundation-gear consist of a floating lever, $o$, and a rod, $p$, connecting one end of the said floating lever $o$ with the beam-lever $a$ of the brake-gear on one truck. For the other truck is a similar floating lever, $o'$, and rod $p'$, and a rod and chain, $r$, connecting one end of the floating lever $o'$ with the upright hand-wheel shaft $b$. A central rod, $q$, connects the said two floating levers $o$ and $o'$.

The springs D, expansible chamber A, and slack lever F comprise one form of "power mechanism," which is controlled by the engineer through the medium of fluid in the train-pipe B. Another form of power mechanism, controlled in the same way, is shown in Fig. 8, and consists of the well-known air-brake. Referring to said Fig. 8, the letter A designates the air-cylinder, $d$ the piston, and G the rod. The rods, chains, levers, and other parts of the foundation-gear in this case are the same as those heretofore described. In operating the brakes on a train of cars by this method the train-pipe B should be connected with the locomotive by an ordinary hose-coupling, $g$, and in like manner between the cars throughout the train.

Whatever may be the description of brake, only one thing is necessary, to wit: that the ordinary rods, chains, and levers of the foundation-gear shall be so loosely adjusted that slack will exist after the diaphragm or piston, as the case may be, has moved forward to the position which it occupies when the brakes are on. This loose adjustment is necessary in order that the power mechanism in the first instance may move forward without placing the brake-shoes hard against the wheels. Any slack that may exist after such forward movement of the diaphragm or piston will be taken up and the shoes pressed hard against the wheels by the hand-brake shaft $b$.

The method of operating the brakes may be stated as follows: The power mechanism is first moved as though to apply the brakes, but without placing the shoes hard against the wheels. The brake-shoes of all the cars must then be applied hard by the hand-wheel shaft $b$ on each car, the pressure exerted on the respective cars being made to correspond as near as may be possible with the load each car may be carrying, and the hand-wheel shaft secured from accidental releasing by a suitable pawl, $b'$, or other device. The brakes may then be released and operated by the action of the fluid-pressure on the power mechanism and controlled entirely by the engineer, who employs the ordinary brake-cock located on the locomotive to permit compressed air to pass from the usual reservoir on the locomotive into the train-pipe B.

The advantages of this method of operating car-brakes are, first, that every time a train starts out from its initial point the brakes of each car are newly adjusted so far as concerns the wear of the shoes, and any permanent spring or bend of the other parts and all undue looseness in the foundation-gear is properly taken up, thereby insuring the best results from the action of the power mechanism; second, each particular car in a train will have a braking pressure applied to its wheels proportioned to the weight of the load on the car, and the most effective braking will be done without liability of sliding the wheels; third, the brakes may be operated by the expenditure of a smaller volume of compressed air, because it is not necessary for the diaphragm or piston to make any movement to compensate for wear of shoes or undue looseness consequent on the permanent spring or bend of any part, all such "slack" being adjusted by the hand-shaft.

The apparatus herein shown is not claimed, it being the subject-matter of an application filed by me in the United States Patent Office on the 26th day of August, 1887, No. 247,916.

Having described my invention, I claim and desire to secure by Letters Patent of the United States--

The method of operating fluid-pressure brakes of cars by first moving the power mechanism as though to apply the brakes, without, however, placing the shoes hard against the wheels, then setting the hand-brakes to apply the shoes against the wheels with the desired pressure, and finally operating the power mechanism by the fluid-pressure.

In testimony whereof I affix my signature in the presence of two witnesses.

GEORGE A. BOYDEN.

Witnesses:
JOHN E. MORRIS,
JNO. T. MADDOX.